United States Patent
Schrafel et al.

(10) Patent No.: US 11,581,755 B2
(45) Date of Patent: Feb. 14, 2023

(54) EFFICIENCY GAINS THROUGH MAGNETIC FIELD MANAGEMENT

(71) Applicant: Momentum Dynamics Corporation, Malvern, PA (US)

(72) Inventors: Peter C. Schrafel, Ithaca, NY (US); Francis J. McMahon, Malvern, PA (US); Matthew L. Ward, Exton, PA (US)

(73) Assignee: InductEV, Inc., Malvern, PA (US)

(*) Notice: Subject to any disclaimer, the term of this patent is extended or adjusted under 35 U.S.C. 154(b) by 257 days.

(21) Appl. No.: 16/940,658

(22) Filed: Jul. 28, 2020

(65) Prior Publication Data
US 2022/0037924 A1    Feb. 3, 2022

(51) Int. Cl.
*H02J 50/12* (2016.01)
*H01F 27/36* (2006.01)
(Continued)

(52) U.S. Cl.
CPC .............. *H02J 50/12* (2016.02); *H01F 27/10* (2013.01); *H01F 27/36* (2013.01); *H01F 27/402* (2013.01); *H01F 2027/348* (2013.01)

(58) Field of Classification Search
CPC .......... H02J 50/12; H02J 7/02; H02J 2310/48; H01F 27/10; H01F 27/36; H01F 27/402;
(Continued)

(56) References Cited

U.S. PATENT DOCUMENTS

| 10,573,445 B2 | 2/2020 | Covic et al. |
| 2003/0161086 A1 | 8/2003 | Anthony |

(Continued)

FOREIGN PATENT DOCUMENTS

| CN | 110999028 | 4/2020 |
| JP | 2020522885 | 7/2020 |
| WO | 2018222669 | 12/2018 |

OTHER PUBLICATIONS

International Application No. PCT/US21/70876, Notification of Transmittal of the international Search Report and the Written Opinion of the International Searching Authority dated Oct. 20, 2021, 11 pages.

(Continued)

*Primary Examiner* — Jared Fureman
*Assistant Examiner* — Michael J Warmflash
(74) *Attorney, Agent, or Firm* — Culhane Meadows, PLLC

(57) ABSTRACT

A resonant induction wireless power transfer coil assembly designed for low loss includes a wireless power transfer coil, a non-saturated backing core layer adjacent the wireless power transfer coil, an eddy current shield, a gap layer between the backing core layer and the eddy current shield, and an enclosure that encloses the wireless power transfer coil, backing core layer, gap layer and eddy current shield. The gap layer has a thickness in a thickness range for a given thickness of the backing core layer where eddy current loss in the eddy current shield is substantially flat over the thickness range. A thickness of the backing core layer and a thickness of the gap layer are selected where a total power loss comprising power loss in the backing core layer plus eddy current loss over the gap layer is substantially minimized.

20 Claims, 11 Drawing Sheets

(51) Int. Cl.
*H01F 27/40* (2006.01)
*H01F 27/10* (2006.01)
*H01F 27/34* (2006.01)

(58) Field of Classification Search
CPC ......... H01F 2027/348; H01F 2027/406; H01F 38/14; H01F 27/366
See application file for complete search history.

(56) References Cited

U.S. PATENT DOCUMENTS

| | | |
|---|---|---|
| 2009/0085706 A1 | 4/2009 | Baarman et al. |
| 2010/0261038 A1 | 10/2010 | Imaoka et al. |
| 2012/0057322 A1 | 3/2012 | Waffenschmidt |
| 2013/0181668 A1 | 7/2013 | Tabata et al. |
| 2013/0222101 A1 | 8/2013 | Ito et al. |
| 2014/0002015 A1 | 1/2014 | Tripathi et al. |
| 2014/0177197 A1 | 6/2014 | Lampinen |
| 2015/0061591 A1 | 3/2015 | Armstrong et al. |
| 2016/0064814 A1 | 3/2016 | Jang et al. |
| 2016/0094082 A1 | 3/2016 | Ookawa et al. |
| 2016/0381829 A1 | 12/2016 | Niizuma et al. |
| 2017/0030039 A1* | 2/2017 | Perez ..................... B60M 7/003 |
| 2017/0033954 A1 | 2/2017 | Henry et al. |
| 2017/0178800 A1 | 6/2017 | Muratov |
| 2018/0233959 A1* | 8/2018 | Peralta ................ H04B 5/0037 |
| 2019/0334391 A1* | 10/2019 | Qi ........................... H01F 38/14 |
| 2020/0168393 A1 | 5/2020 | Long et al. |

OTHER PUBLICATIONS

"International Application Serial No. PCT US2018 035060, International Search Report dated Aug. 27, 2018", 3 pgs.

"International Application Serial No. PCT US2018 035060, Written Opinion dated Aug. 27, 2018", 9 pgs.

"U.S. Appl. No. 16/615,290, Preliminary Amendment filed Nov. 20, 2019", 9 pgs.

"International Application Serial No. PCT US2018 035060, International Preliminary Report on Patentability dated Dec. 12, 2019", 11 pgs.

"European Application Serial No. 18810537.3, Response to Communication Pursuant to Rules 161(1) and 162 EPC filed Feb. 25, 2020", 4 pgs.

* cited by examiner

EFFICIENCY GAINS THROUGH MAGNETIC FIELD MANAGEMENT

CROSS-REFERENCE TO RELATED APPLICATIONS

The present patent application is related to U.S. patent application Ser. No. 16/615,290, filed Nov. 20, 2019, entitled "Wireless Power Transfer Thin Profile Coil Assembly," which is a national phase entry of PCT/US2018/035060, filed May 30, 2018, which claims priority to U.S. Provisional Patent Application No. 62/512,544, filed May 30, 2017. The contents of these patent applications are hereby incorporated by reference.

TECHNICAL FIELD

This patent application describes a wireless power transfer coil assembly as it pertains to wireless charging through use of magnetic resonant induction. The wireless power transfer coil assembly described herein can be used as part of the sending and/or as part of the receiving wireless power transfer apparatus.

BACKGROUND

Resonant induction wireless charging makes use of an air core transformer consisting of two concentric coils displaced along a common coil axis. Electrical power is sent from the sending apparatus to the receiving apparatus by means of magnetic flux linkage between the two transfer coils. As elucidated in Faraday's law of induction, the first coil, the primary or transmitter, creates the time-varying magnetic field. The corresponding secondary or receiver coil converts the magnetic flux received to an electrical signal for use in powering electrical systems such as an electric vehicle or the charging system for electrical storage (e.g. a battery). Such air-core transformers use individual cores (nominally made of ferrite) situated behind the primary and secondary coils rather than core(s) positioned to make a complete magnetic circuit between the coils as is normal for non-air core transformers.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

In sample embodiments, a resonant induction wireless power transfer coil assembly designed for low power loss is provided. The assembly includes a wireless power transfer coil, a non-saturated backing core layer adjacent the wireless power transfer coil, an eddy current shield, a gap layer between the backing core layer and the eddy current shield, and an enclosure that encloses the wireless power transfer coil, backing core layer, gap layer and eddy current shield. The gap layer has a gap layer thickness in a gap layer thickness range for a given thickness of the backing core layer where eddy current loss in the eddy current shield is substantially flat over the gap layer thickness range. A thickness of the backing core layer and a thickness of the gap layer are selected where a total power loss comprising power loss in the backing core layer plus eddy current loss in the eddy current shield is substantially minimized. The backing core layer may comprise backing core, layered metallic sheets, powdered oxides, sintered powdered oxides, and/or amorphous metals.

In sample embodiments, the gap layer may comprise an air space, a non-magnetic filling agent, a non-magnetic structural support element, at least one non-magnetic conduit, and/or a non-magnetic coolant. The at least one conduit may circulate a cooling/heating fluid that may be air or a liquid. The at least one conduit may comprise a non-conductive, non-magnetic material placed immediately against the backing core layer and/or immediately against the eddy current shield. A thermal management device may also be provided to circulate the cooling/heating fluid in the at least one conduit to thermally manage the backing core layer to substantially minimize power loss due to hysteresis heating and/or to thermally manage the wireless power transfer (WPT) coil assembly.

In other sample embodiments, the eddy current shield may comprise one or more temperature sensors that provide temperature readings to the thermal management device. In turn, the thermal management device may control circulation of the cooling/heating fluid to maintain the backing core layer at a predetermined temperature to minimize power loss. The thermal management device may provide an inlet air temperature and temperature readings from the backing core layer to a predictive model to anticipate heating/cooling requirements. When the cooling or heating requirements are forecast to exceed the capabilities of passive cooling or passive heating, the circulation of the cooling/heating fluid is controlled to adjust a temperature of the backing core layer. A cooling/heating fluid reservoir may be provided with at least one valve that is controlled by the thermal management system to provide cooling/heating fluid to the gap layer via the at least one conduit.

In accordance with other aspects, a method of assembling a wireless power transfer assembly of a wireless power transfer system is provided. The method includes providing a non-saturated backing core layer adjacent a wireless power transfer coil; providing an eddy current shield separated by a gap layer from the backing core layer, the gap layer having a gap layer thickness in a gap layer thickness range for a given thickness of the backing core layer where eddy current loss in the eddy current shield is substantially flat over the gap layer thickness range; and enclosing the wireless power transfer coil, backing core layer, gap layer and eddy current shield in an enclosure. The method further includes selecting a thickness of the backing core layer versus a thickness of the gap layer where a total power loss comprising power loss in the backing core layer plus eddy current loss over the gap layer is substantially minimized. In sample embodiments, the method includes a total constrained thickness, C, where $C=d_g+d_f$, $d_f$ is a thickness of the backing core layer, and $d_g$ is the gap layer thickness.

In sample embodiments, the method includes circulating a cooling/heating fluid through at least one conduit in the gap layer. The at least one conduit may be placed immediately against the backing core layer. A thermal management device may thermally manage the backing core layer to minimize power loss by managing circulation of the cooling/heating fluid through the at least one conduit. The thermal management device may further provide an inlet fluid temperature and temperature readings from the backing core layer to a predictive model to anticipate heating/cooling requirements. When the cooling or heating requirements are forecast to exceed capabilities of passive cooling or passive heating, circulation of the cooling/heating fluid is controlled to adjust a temperature of the backing core layer. The method may further include providing at least one cooling/heating fluid reservoir with at least one valve. The thermal management system may control the at least one valve to provide cooling/heating fluid to the gap layer via the at least one conduit to provide heating or cooling to the backing core layer to substantially minimize power loss.

It will be appreciated that any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION OF ILLUSTRATIVE EMBODIMENTS

Figure 1:
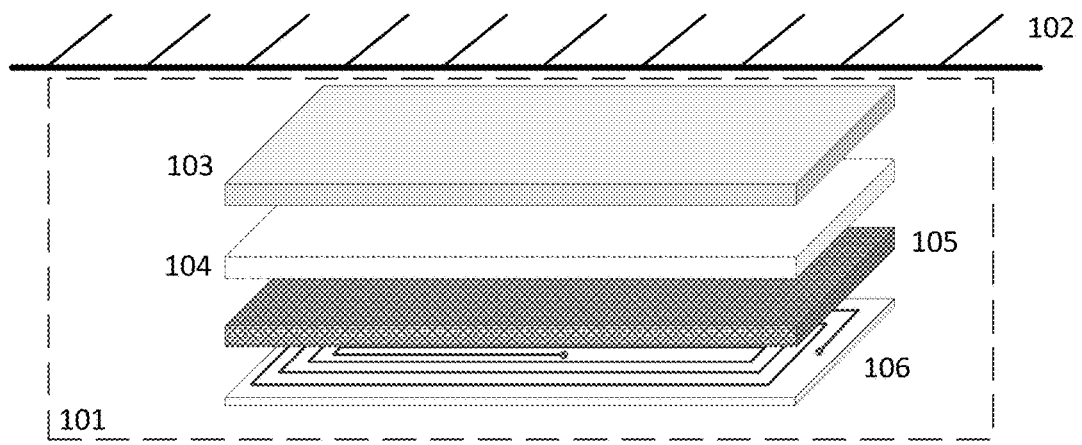
FIG. 1 shows the major components of a Vehicle Assembly in a Wireless Power Transfer System.

The wireless power transfer coil assembly, enclosure, mountings, and associated method described herein may be understood more readily by reference to the following detailed description taken in connection with the accompanying figures and examples, which form a part of this disclosure. It is to be understood that this description is not limited to the specific products, methods, conditions or parameters described and/or shown herein, and that the terminology used herein is for the purpose of describing particular embodiments by way of example only and is not intended to be limiting of any claimed subject matter. Similarly, any description as to a possible mechanism or mode of action or reason for improvement is meant to be illustrative only, and the subject matter described herein is not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments will now be described with reference to FIGS. 1-12. Although this description provides a detailed example of possible implementations, it should be noted that these details are intended to be exemplary and in no way delimit the scope of the inventive subject matter.

As previously taught in PCT application PCT/US2018/035060, "WIRELESS POWER TRANSFER THIN PROFILE COIL ASSEMBLY," ferrite core layer thinning is desirable as a means of reducing transfer coil weight and cost. As described herein, the thickness of backing core layers (e.g., ferrite) and positioning also can be used to control and optimize (nominally minimize) power loss due to heating and induced eddy currents.

Examples and terminology in the figures are directed to the stationary charging of conventional electrical vehicles (EVs) such as cars, trucks, and buses. Other uses (e.g. charging of rail engines, boats, dynamic charging roadways or railways) are not precluded by these descriptions. In addition to charging of EVs, the wireless power transfer (WPT) system described herein is symmetric and may allow discharge of the EV's power storage (e.g. a battery, capacitive bank, reversable fuel cell) for use in powering ground side electronics (e.g. as a home power backup or electrical grid management system).

While single ground assembly (GA) and vehicle assembly (VA) systems, consisting of a single coil each, are shown in examples, higher power systems using a modular approach, where multiple GA coils are geometrically placed in clusters and corresponding VA coil clusters are installed on EVs, are also contemplated.

The terms "backing core" and "ferrite" as used to describe materials used to guide magnetic flux and are not meant to limit the selection of such materials. Both terms are used herein as a generic for any a construction of high-permeability magnetic material, with high-permeability meaning a relative permeability substantially larger than 1 (nominally >100). The term ferrite is not meant to preclude this use of other similar or compatible materials that could be used in construction of a backing core and may include layered metallic sheets, powdered oxides, sintered powdered oxides, and/or amorphous metals.

FIG. 1

FIG. 1 illustrates the major components of a Vehicle Assembly (VA) 101 for managing the magnetic field needed for wireless power transfer. In this exploded view, the relative thicknesses of the various layers are not shown and the spacing between layers are exaggerated for the purposes of illustration. Omitted from the figure are structural support elements, galvanic isolation, water proofing and associated circuitry, all of which do not materially impact the distribution of magnetic flux.

The VA 101 is normally affixed to the underside of an electric vehicle (EV), but lateral or dorsal installation is possible in some EV applications. Shown here, the underside of the vehicle chassis 102 provides attachment for the conductive metallic backplate 103. The backplate 103 acts as the eddy current shield, protecting the chassis and conductive components of the EV from stray magnetic flux. A gap layer 104 separates the backplate 103 from the backing core 105. The secondary coil 106 may be a circular or a rectangular coil of windings held or embedded in a non-magnetic substrate to maintain spacing, galvanic isolation, and heat transfer. The secondary coil 106 is the bottommost layer of the VA 101 magnetic components.

FIG. 2

Figure 2:
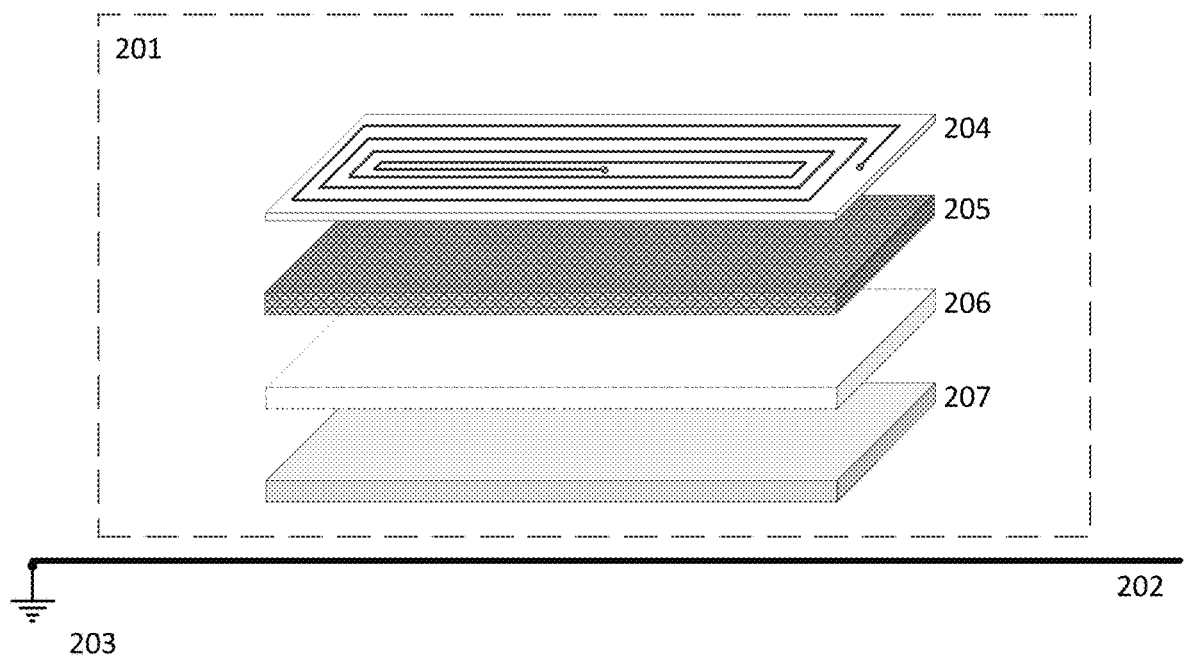
FIG. 2 shows the major components of a Ground Assembly in a Wireless Power Transfer System.

In FIG. 2, the major components of a Ground Assembly (GA) 201 for managing the magnetic field needed for wireless power transfer are shown. In this exploded view, the relative thicknesses of the various layers are not shown and the spacing between layers are exaggerated for the purposes of illustration. Omitted from the figure are structural support elements, galvanic isolation, water proofing, coverings, and associated circuitry, all of which do not materially impact the distribution of magnetic flux.

The GA 201 is nominally placed flat on (or in) the pavement 202, which may be grounded 203. The magnetic field producing primary coil 204 may be a circular or rectangular coil of windings embedded in a non-magnetic substrate to maintain spacing, galvanic isolation, and heat transfer. The primary coil 204 is the topmost layer of the GA 201 magnetic components. The backing core 205 is placed below the primary coil 204 and serves to guide the magnetic flux produced not only by the primary coil 204 but also that produced by the VA secondary coil 106 (see FIG. 1). A gap layer 206 is immediately below the backing core 205. The conductive metallic backplate 207 between the gap layer 206 and the pavement 202 serves to not only mechanically support the GA 201 but also may provide electrical ground to the unit. In some installations, this grounding is locally provided, remotely provided by the incoming power connections (not shown), or optional.

FIG. 3

Figure 3:
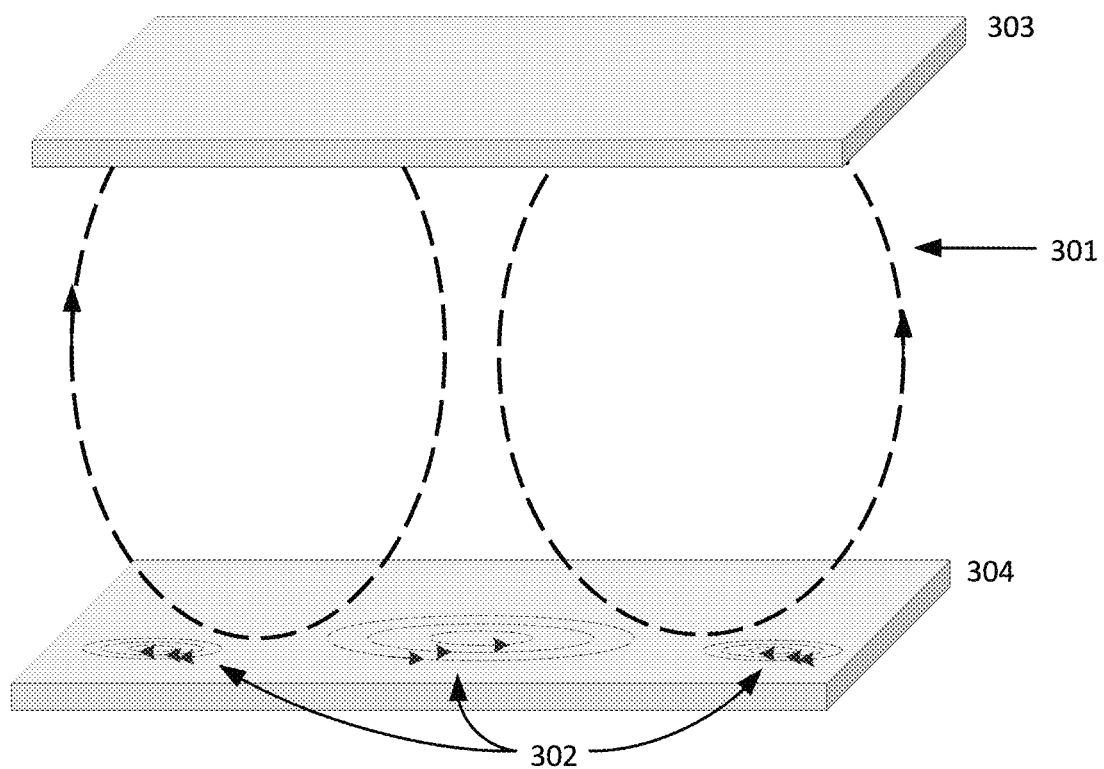
FIG. 3 depicts induced eddy currents due to an applied magnetic field in conductive housings acting as eddy current shields.

FIG. 3 shows the magnetic flux behavior that causes eddy current and thus power loss from joule heating in the eddy current shield. In this example, the eddy current shield is formed by the conductive metal backplates 303, 304 of the assembly.

In an air core transformer, the primary coil uses a supplied oscillating electrical current to generate a time-varying magnetic field. Some of the uncontained magnetic flux may impinge on surrounding metal housings and external conductive objects.

FIG. 3 shows this uncontained magnetic flux 301 causing eddy currents 302 in the eddy current shields (e.g. metallic housings) 303 and 304. These eddy currents 302 are created almost entirely on the inner side of the metallic housings 303 and 304 proximal to the parallel primary and secondary coils of an open transformer (not shown) because the oscillating magnetic flux 301 cannot deeply penetrate the conductive metal of the housings 303, 304. These eddy currents 302 are a significant source of loss from joule heating.

FIGS. 4-7

FIGS. 4-7 are graphs used to illustrate the effect of a gap layer between a specific thickness of a backing core (e.g. a ferrite sheet) and the metal backplate of the vehicle assembly (VA) or Ground Assembly (GA). Use of a ferrite backing core sheet of uniform thickness is contemplated in FIGS. 4-7 for purposes of simplification. Use of continuous sheets (or sheets comprised of interlocking or overlaid ribbons of backing core material) is advantageous both from a prevention of magnetic flux leakage perspective and from an economic benefit of lower material cost.

Magnetic flux distribution in the thin backing core creates an upper bound for the scenarios shown in FIGS. 4-7. When a backing core layer is sized so that the magnetic flux density (at the prescribed externally applied magnetic field (H)) is uniform throughout the thickness aspect, it is then a thin core. Saturation in thin cores presents a downward limit on the thickness of the backing core in the scenario shown in FIG. 5. In a thin backing core, saturation is reached when the backing core becomes too thin whereby the magnetic flux cannot be completely redirected at the applied external magnetic field (H) strength. The backing core thicknesses shown in FIGS. 4-7 were selected to avoid backing core thicknesses small enough to have saturation effects.

Shaping or contouring of a backing core (i.e., increasing the thickness in areas of high magnetic flux and thinning in areas of low magnetic flux while avoiding saturation of the backing core) can be combined with any of the scenarios envisaged in FIGS. 4-7 to reduce overall backing core weight, which is quite important in mobile applications (e.g. in a Vehicle Assembly) as vehicle weight directly affects vehicle range and thus charging time. Increasing range and decreasing charging times are critical factors in broadening acceptance of electric vehicles versus those using internal combustion engines.

In an air-core transformer as illustrated in FIG. 1 and FIG. 2, eddy currents are induced by the magnetic flux impinging on the conductive backplates. The tangential component of the magnetic field strength has a discontinuity at the conductive surface interface equal to the magnitude of the induced eddy current. Magnetic field strength is high in the backing core and drops off to zero with skin-effect decay in the conductive backplate.

Introduction of a gap layer between the backing core (e.g., ferrite layer) and the conductive backplate reduces the change in magnetic field strength across the edge of the conductive backplate. This reduces the magnitude of the eddy currents and their associated power loss. Continued increases in gap layer size have a minimal effect on power loss because the change in magnetic field strength across the conductive backplate interface has already been significantly reduced.

Another influence on design is that the thickness (and mass) of the backing core also affects the heat transfer from the coil and heat retention of the backing core.

Mathematically, the losses incurred by the backing core (e.g. ferrite) and the induced eddy currents can be expressed as:

$$P_{total} = P_{core} + P_{eddy} \qquad \text{Equation (1)}$$

where; "$P_{total}$"=total power loss, "$P_{core}$"=magnetics loss (e.g. in the backing core), and "$P_{eddy}$"=eddy current loss in conductive backplate.

The backing core loss can be calculated using a modified version of the Steinmetz equation (power loss per area W/m²) wherein:

$$P_{core} = k f^a \left(\frac{\Phi}{w}\right)^b (d_f)^{1-b} \qquad \text{Equation (2)}$$

where the variables are k, a, b=material dependent 'Steinmetz coefficients' with $1 < a < 2$ and $2 < b < 3$, f=frequency, $\Phi$=total magnetic flux, w=effective backing core width (dimension perpendicular to plane of coil), and $d_f$=backing core thickness. The backing core loss is primarily due to hysteresis heating in the backing core caused by the oscillating magnetic flux.

In the modified Steinmetz equation, because b>2, this equation shows $P_{core}$ going down as the backing core thickness increases, even though more backing core is being added (in an attempt to better redirect flux) which is a lossy material. The reduction in flux density by adding a gap layer between the backing core and backplate more than makes up for the addition of more backing core material.

The eddy current power loss (power loss per area W/m²) can also be calculated for an AC magnetic field impinging on a large conductor more than a few skin-depths thick as follows:

$$P_{eddy} = \frac{B(d_g)^2}{2\mu_0}\sqrt{\frac{\pi f}{\mu_0 \sigma}}$$ Equation (3)

where $d_g$=gap layer thickness, $B(d_g)$=magnetic flux density at the surface of a conductive backplate as a function of gap layer thickness. When the gap layer thickness is 0, $B(d_g)$ =$B_{core}$. As the gap layer thickness increases, $B(d_g)$ goes down. $\mu_0$=magnetic constant ($4\pi \times 10^{-7}$ H/m); f=frequency in Hz, and $\sigma$=conductivity of conductive backplate in siemens/meter.

In some deployments, a non-conductive backplate may be used (approximating the case where $\sigma$=0). Since the backplate acts as the eddy current shield, such deployments include those Ground Assemblies (GA) embedded in pavement, since flux extending past the backing core (e.g. ferrite) layer will not impinge or affect people or equipment on the surface. GAs that are embedded in parking garage floors will use eddy current shields to manage flux to not impinge on the floor below. Surface mount (permanently or temporarily mounted on the pavement surface) GAs may use eddy current shields with the appropriate gap layer to reduce overall installation height.

FIG. 4

Figure 4:
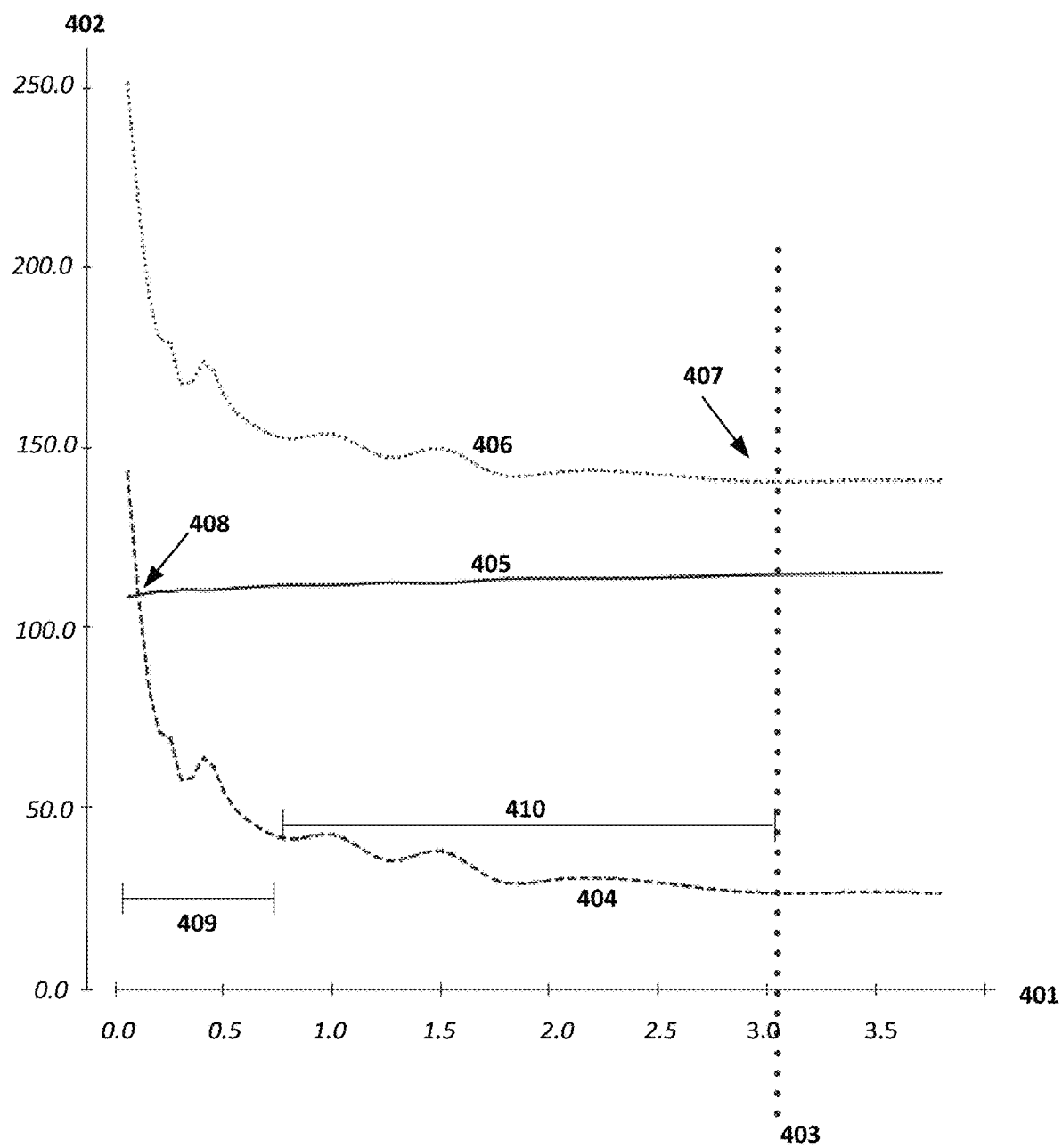
FIG. 4 illustrates the effect of increasing the gap layer thickness between the backing core and the backplate on power loss in a magnetic power transfer system.

In FIG. 4, the position of the fixed-thickness backing core layer (e.g., the ferrite layer) is displaced from the metallic backplate by the progressive addition of a gap layer. The gap layer may consist of air space(s), a non-magnetic filling agent, non-magnetic structural support elements and conduits, non-magnetic coolant, or any mix thereof. In the example shown in FIG. 4, the WPT system is transferring 60 kilowatts.

In FIG. 4, the x-axis 401 is used to show the increasing thickness of the gap layer (in mm) and thus the displacement of the backing core away from the backplate. The y-axis 402 is used to show the power losses (in watts). The eddy current loss is shown in curve 404. As indicated, the eddy current losses shown in curve 404 are highest when the backing core is in near-contact with the metal backplate, that is when the gap layer is thinnest. The backing core power loss component curve 405 shows that the backing core loss is nearly constant in the useful regions of 409, 410, and beyond. In second region 410, increasing gap layer thickness shows diminished returns versus in first region 409. After introduction of a gap layer thickness 403 with lowest eddy current loss, both eddy current losses shown in curve 404 and backing core power losses shown in backing core power loss component curve 405 remain stagnant. Increases in gap layer thickness beyond 403 thus introduce additional, undesirable thickness while producing virtually no improvement in efficiency.

The total power loss curve 406 shows that an optimal power loss point 407 can be determined. This optimal power loss point 407 will vary with the backing core thickness used but the relationship between backing core losses and eddy current losses in the backplate will follow the same pattern for thin backing cores. As the gap layer is thickened, the losses in the backing core increase the y-axis value of the crossover point 408 where backing core losses in backing core power loss component curve 405 dominate. The eddy current loss curve 404 shows a steep reduction that continues to decrease over an initial region 409 before substantially flattening in a second region 410. Although gap layer thicknesses over second region 410 show small reductions in eddy current power losses, the addition of gap layer thickness can be beneficial for the introduction of cooling apparatus and media. Continued increases in gap layer thickness over 403 have little to no effect on eddy current losses but are available for increased cooling flow at lower pressures.

In some applications, increased power losses due to eddy currents in the backplate before the optimal (i.e., minimum) power loss point 407 may be acceptable (for instance to decrease the overall assembly thickness by limiting the backing core plus gap layer thickness). The introduction of additional gap layer thickness beyond 403 shows no increased efficiency but could be used to create additional cooling volume, albeit at the cost of additional thickness in the WPT assembly (GA or VA). In applications where the assembly is required to be at or below a specific thickness (for instance for when the GA is surface mounted on pavement, or the VA must adhere to limited vehicle underbody constraints), the gap layer can be reduced with little repercussions to efficiency in the $3^{rd}$ gap layer thickness region beyond the gap layer thickness where the eddy current losses are minimized 403. In addition, if the addition of losses and heating can be tolerated, lesser efficiencies are possible in the $2^{nd}$ gap layer thickness region 410. The $1^{st}$ gap layer thickness region 409 has a steeply asymptotic behavior towards eddy current losses as the gap layer thickness is reduced and while construction of an assembly is possible in this range, reductions to the backing core thickness may be favorable to continued decreases in the gap layer thickness.

FIG. 5

Figure 5:
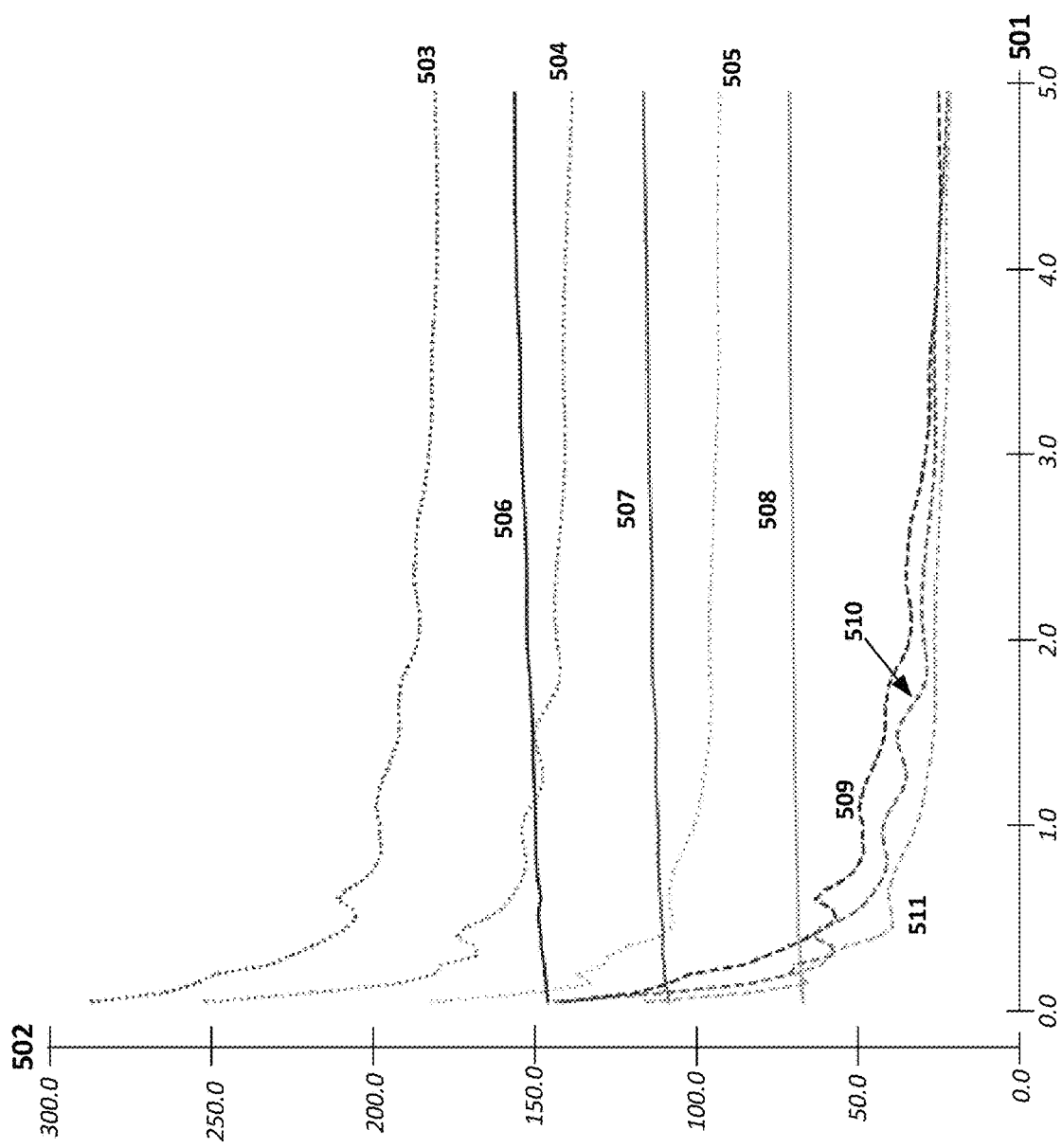
FIG. 5 shows the power losses expected for differing backing core thicknesses and expanding gap layer thicknesses.

FIG. 5 shows the modeled power losses for a wireless power assembly (either primary or secondary). FIG. 5 illustrates plots for power losses for multiple backing core thicknesses over a progressive range of additional gap layer thickness inserted between the backing core and the backplate.

The X-axis 501 shows the addition of gap layer from zero to 5 mm. The Y-Axis 502 shows power loss in watts.

For a 5 mm thick backing core, the total power loss line 503 is the sum of the backing core loss line 506 and the backplate induced eddy current loss line 509 as shown.

For a 6.35 mm backing core thickness, the total power loss line 504 is the sum of the backing core loss line 507 and the backplate induced eddy current loss line 510 as shown.

For a 9.5 mm thick backing core, the total power loss line 505 is the sum of the backing core loss line 508 and the backplate induced eddy current loss line 511 as shown.

For each of the backing core thicknesses, the same behavior in total power loss at 503, 504, and 505 is seen with highest power losses occurring at minimum gap layer thickness. As gap layer thickness is increased (moving to the right on the x-axis 501) the increasing gap layer thickness reduces the eddy current losses at 509, 510, and 511 while the backing core losses at 506, 507, and 508 remain static. For each backing core thickness, addition of gap layer shows diminishing returns to power loss savings until becoming fairly static.

FIGS. 6-7A

Figure 6:
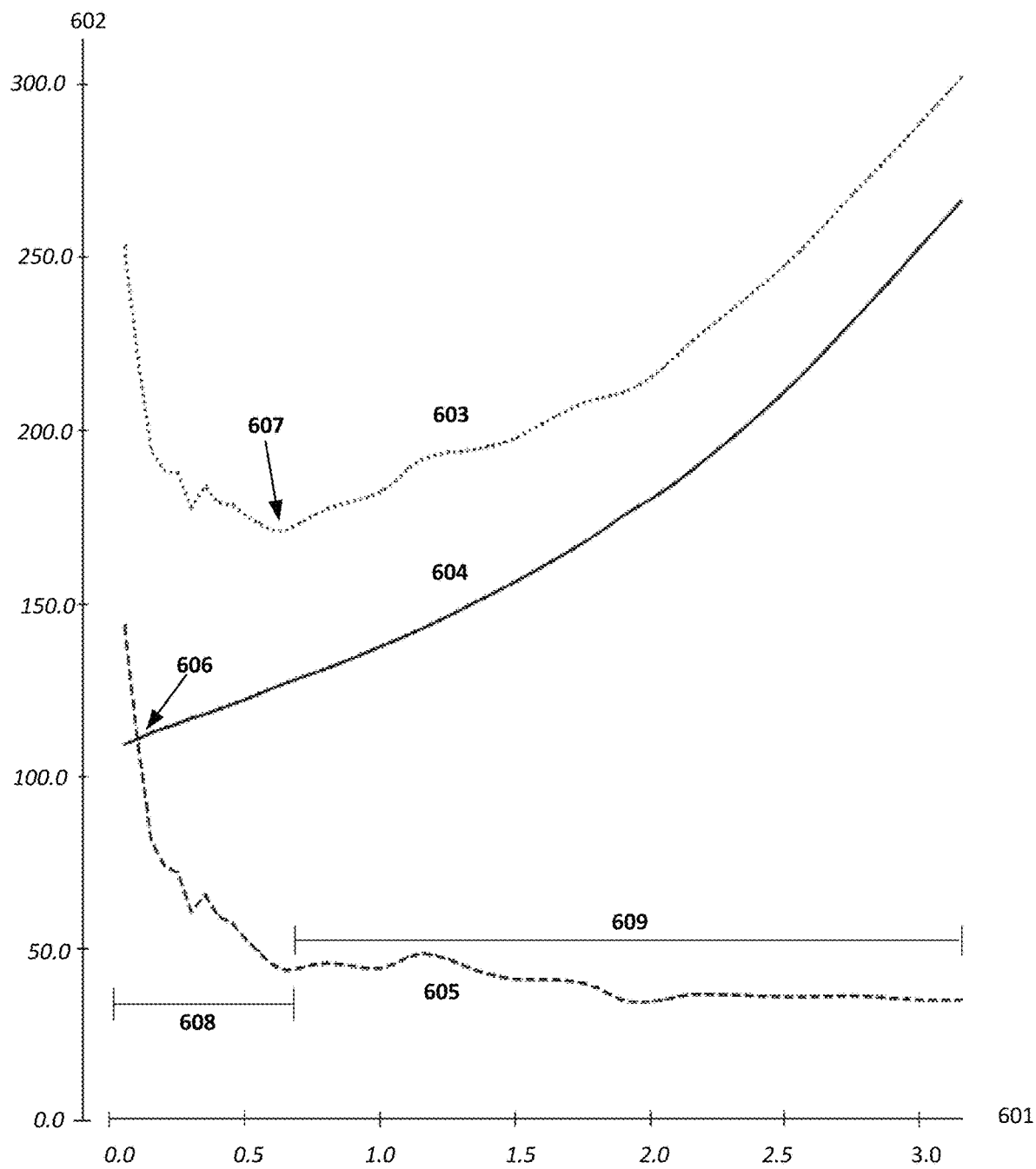
FIG. 6 illustrates the relative relationship between backing core layer thickness versus gap layer thickness and power losses in a magnetic power transfer system.

FIG. 6 illustrates the power losses incurred at differing thicknesses of backing core with introduced backing core-to-backplate gap layers. As illustrated in FIG. 5, the total assembly thickness increases as the backing core thickness and therefore potential gap layer thicknesses are increased.

Figure 7A:
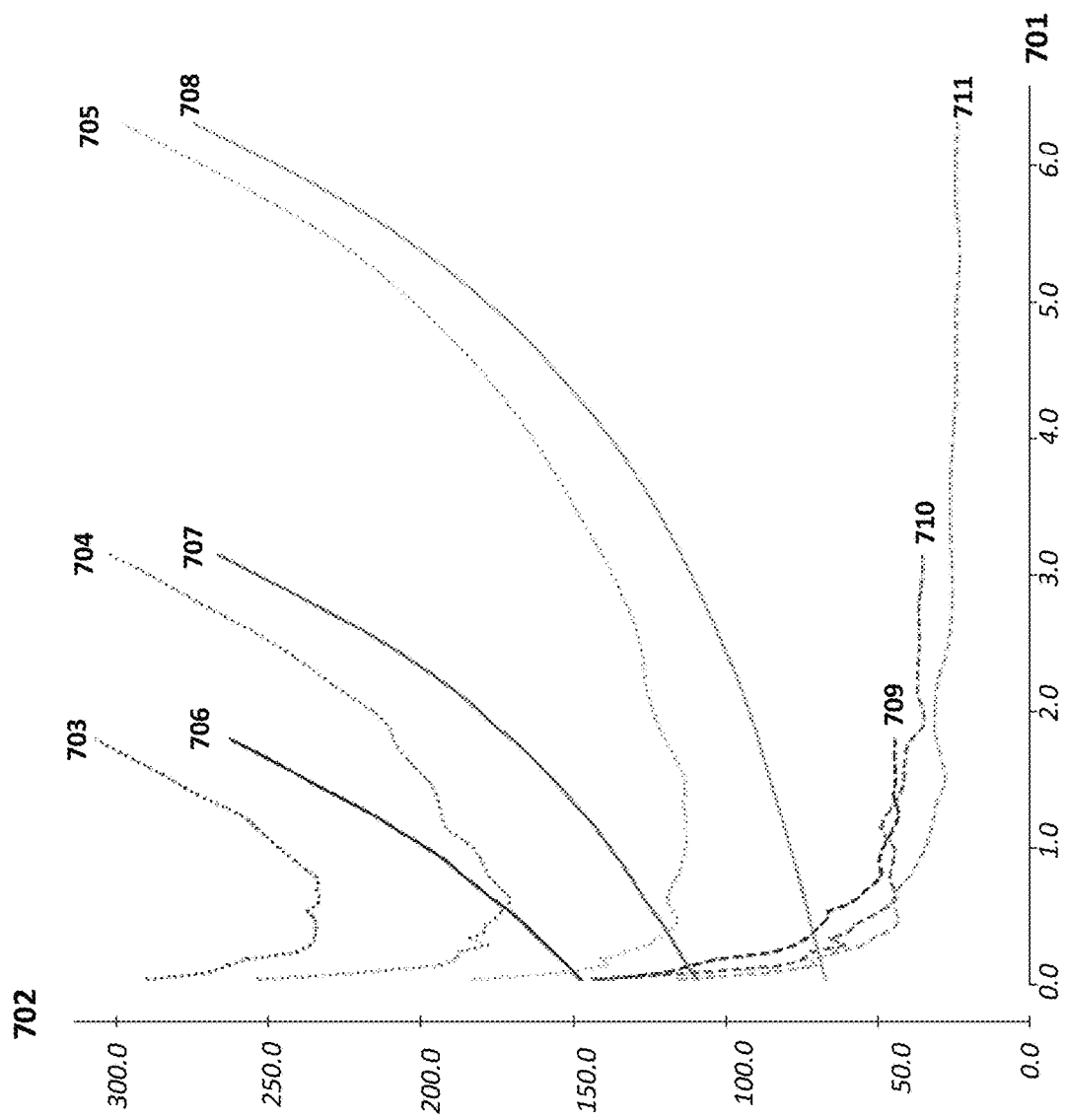
FIG. 7A shows the power losses expected for a fixed layer where differing backing core thicknesses are progressively thinned to increase the gap layer thickness.

Since in FIGS. 6 and 7A the total allowed thickness is constrained as described above with respect to Equations (1)-(3), the gap layer thickness and backing core thickness are constrained yielding $d_g + d_f = C$, where C=constrained thickness, $d_f$=backing core thickness and $d_g$=gap layer thickness. In both FIGS. 6 and 7A, moving to the right along the x-axis, $d_g$ is increased as C is held constant.

FIG. 6

In FIG. 6, the replacement (thinning) of the backing core (e.g. a ferrite sheet) with addition (thickening of) gap layer is shown. Since, especially on the receiver side (e.g. the vehicle mounted assembly), the assembly thickness can be limited by installation space availably (e.g. to maintain vehicle ground clearance) minimization of assembly thickness is vital. As such, the thickness of the magnetic flux control layer (i.e. the backing core layer and gap layer as described in FIG. 6) may be constrained by the overall thickness design goal. The gap layer may consist of air space(s), a non-magnetic filling agent, non-magnetic structural support elements and conduits, non-magnetic coolant, or any mix thereof.

As illustrated in FIG. 6, the x-axis 601 is used to show the thickness of gap layer when the total thickness of the gap layer and the backing core sheet is held constant. The y-axis 602 is used to show the power level loss (in Watts). Three curves 603, 604, and 605 are plotted. The eddy current loss is shown in curve 605. The eddy current loss curve 605 indicates loss is highest when the backing core is both thickest and in near-contact with the metal backplate. The backing core power loss component curve 604 shows that the power loss increases as the backing core is thinned and the resultant gap layer thickness is increased. As the backing core layer is thinned, the losses in the backing core increase. At the crossover point 606, backing core power losses 604 dominate, but eddy current power losses 605 continue to fall.

The total power loss curve 603 shows that an optimal (substantially minimal) power loss point 607 can be determined. In FIG. 6, the power loss is substantially minimized over the introduced thicknesses of gap layer (and resultant thinning of the backing cored layer) of about 0.25 mm to 1.0 mm.

The eddy current loss curve 605 shows a steep reduction continue to decrease over an initial region 608 before substantially flattening in a second region 609. Continued decreases in thickness of the backing core sheet and resultant addition of gap layer have little to no effect on eddy current losses over region 609.

In some applications, increased backing core power losses past the optimal loss point 607 may be acceptable (for instance to decrease the overall assembly thickness, achieve a cost or weight reduction from the thinning of backing core, or to provide additional cooling/coolant volume).

FIG. 7A

FIG. 5 illustrates the power losses incurred at differing thicknesses of backing core with introduced backing core-to-backplate gap layers while FIG. 7A illustrates that the total assembly thickness cannot increase as gap layer is introduced and backing core thickness is removed. The X-axis 701 shows the replacement of backing core with gap layer while the Y-axis 702 shows power loss in watts.

The total power loss summation of the backing core loss and eddy current losses are shown for three backing core thicknesses. Each of these backing core thicknesses is reduced as gap layer is added. The total power loss line for a 5 mm backing core 703 is the summation of the backing core losses 706 and the eddy current losses 709. The 6.35 mm backing core power loss line 704 shown is the sum of the 6.35 mm backing core losses 707 and the eddy current losses 710. The 9.5 mm backing core scenario total loss line 705 is the sum of the backing core losses 708 and the eddy current loss 711.

For all the starting backing core thicknesses, the backing core loss 706, 707, and 708 proportionally increases as the backing core thickness decreases. The eddy current losses 709, 710, and 711 show the expected improvements in power losses as the additional gap layer replaces backing core. In FIG. 7A, the power loss is substantially minimized for each backing core over replacement gap layer thicknesses of about 0.25 mm to about 0.75 mm for the 5 mm backing core 703 to about 0.25 mm to about 2.0 mm for the 9.5 mm backing core.

FIG. 7B

Figure 7B:
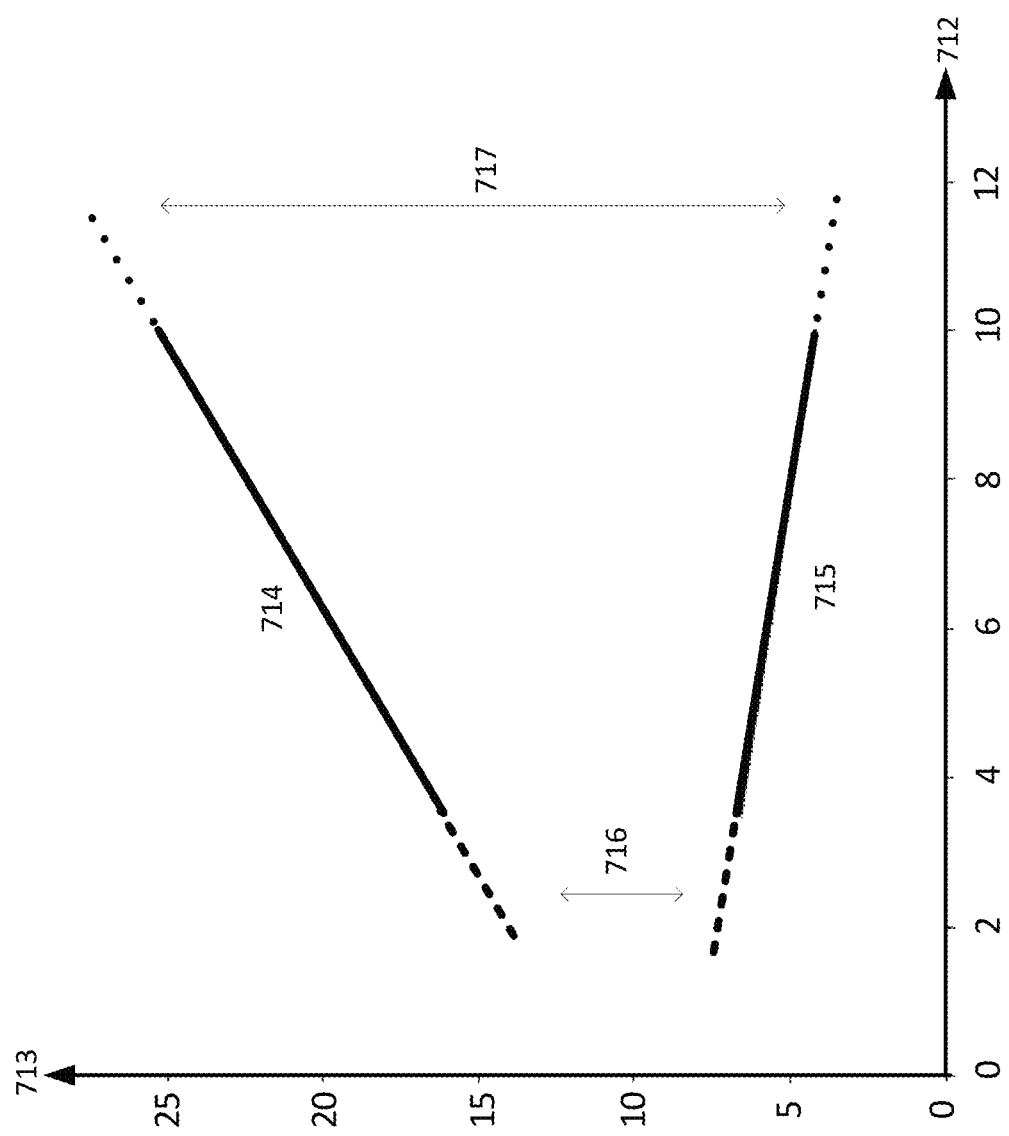
FIG. 7B shows the substantially optimized ratio range of backing core thickness to gap layer thickness for an exemplary range of total thickness (sum of backing core and gap layer).

FIG. 7B shows the substantially optimized ratio range of backing core thickness to gap layer thickness for an exemplary range of total thickness (sum of backing core and gap layer). Using these ratios, the gap layer thickness where total power loss is substantially minimized can be selected for a given thickness of backing core layer given the constraints of a thin backing core.

The x-axis 712 shows the total thickness in millimeters. The y-axis 713 shows the ratio of backing core layer thickness to gap layer thickness. The top boundary 714 and bottom boundary 715 show the upper and lower limits respectively of the ratios for a given backing core thickness. Between the boundaries 714 and 715, the total power loss due to backing core losses and eddy current losses are substantially minimized, i.e. within 5% of the absolute minimum. Due to the properties of different backing cores, the exact point of backing core saturation 716 may vary. For the same reason, the exact point 717 where the magnetic flux density in the backing core becomes non-uniform may vary.

FIG. 8

Figure 8:
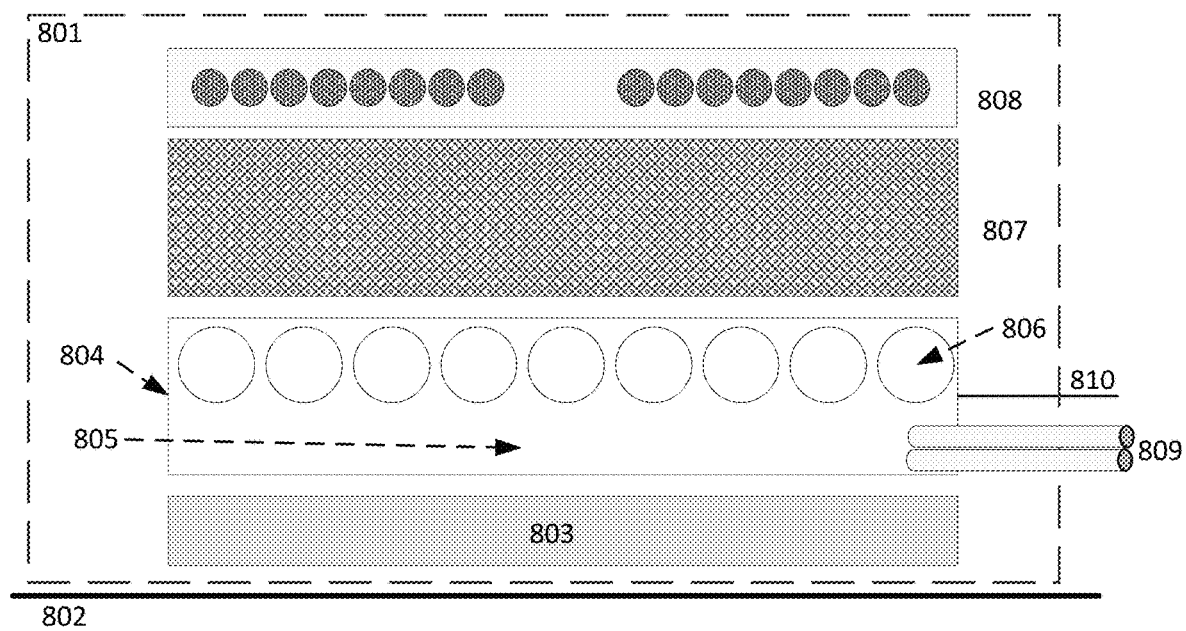
FIG. 8 illustrates an advantageous use of backing core layer spacing in a Ground Assembly.

In FIG. 8, an exploded view of the GA 801 is shown. Using this view, the relative thicknesses of the various layers are not shown and the spacing between layers is exaggerated for the purposes of illustration. Omitted from the figure are structural support elements, galvanic isolation, water proofing and associated circuitry, all of which do not materially impact the distribution of magnetic flux. In this illustrative example, the GA is surface mounted affixed to a pavement surface 802.

As illustrated in FIG. 8, the GA 801 comprises a metal backplate 803 that functions as an eddy current shield, a gap layer 804, a backing core layer 807, and a primary coil 808. In sample embodiments, the backing core spacing may be set to optimize for the lowest power loss as described with respect to FIGS. 4 and 7. As illustrated in FIG. 8, the resulting gap layer 804 can be used for the cooling (and heating) of the coil assembly using coolant pipes 806. Ideally, the GA 801 would have a high-use rate with waste heat generation near-constant and limited cool down periods between charging/use sessions. External, input and output, connections 809 to coolant resources supplies may be laid over or under the pavement. A local or remote ground connection may be provided, if necessary, to provide grounding.

In sample embodiments, the gap layer 804 is filled with a non-magnetic material, for instance an air space(s), an active or passive cooling/heating system (liquid or air-based), conduits, structural supporting members, or a mix of the aforementioned. In one example, coolant pipes 806 made of non-conductive, non-magnetic material are placed immediately against the backing core layer 807 or eddy current shield 803, which both generates heat and conducts heat from the primary coil 808 during a wireless power charging session. Since the backing core works best in specific temperature ranges, the coolant can provide both cooling and heating as needed. The gap layer 804 not used for piping or thermal conductive surfacing may be filled with a non-magnetic heat conductive material 805 with mechanical supporting structures. In one example, an idle GA (or GA cluster) is supplied waste heat from the power electronics and/or co-located charging stations to maintain efficient backing core temperature.

FIG. 9

Figure 9:
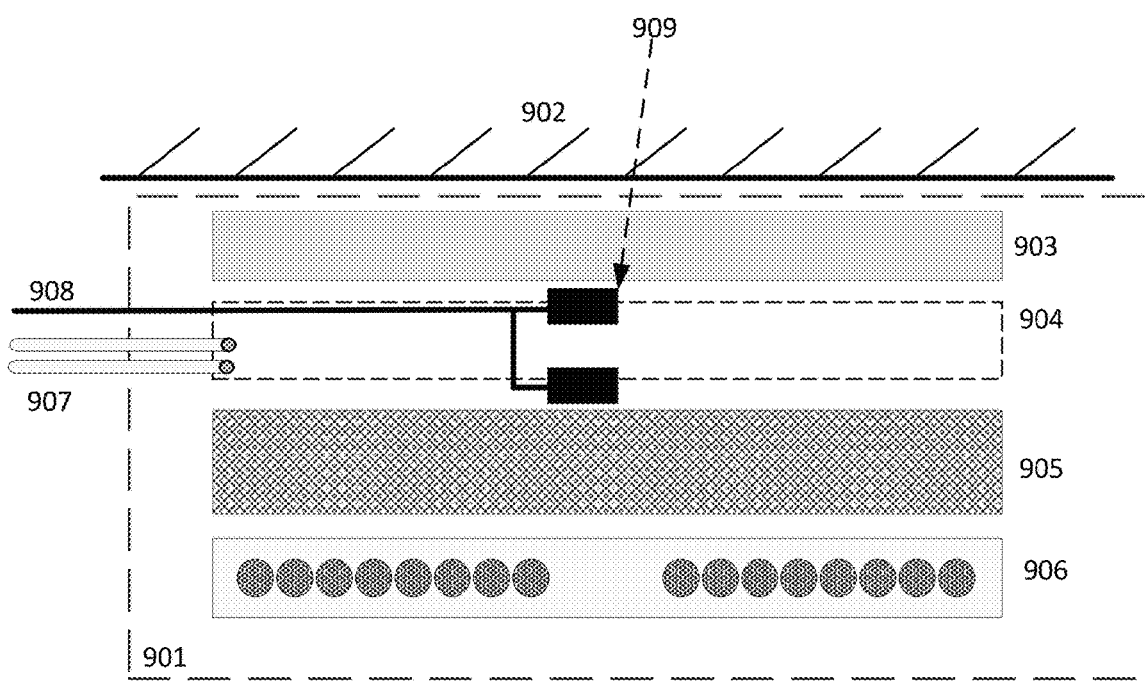
FIG. 9 illustrates an advantageous use of backing core layer spacing in a Vehicle Assembly.

FIG. 9 provides an exploded view of the vehicle assembly (VA) 901. In FIG. 9, the relative thicknesses of the various layers are not shown and the spacing between layers are exaggerated for the purposes of illustration. Omitted from the figure are structural support elements, galvanic isolation, water proofing and associated circuitry, all of which do not materially impact the distribution of magnetic flux.

The VA 901 operates under different environmental and mechanical constraints than the GA 801 but can make use of a gap layer. One major constraint is that the VA 901 in some installations must be thin as possible to better be placed under the chassis of the vehicle. The reduction of weight is another constraint as is the limited charging time. The VA 901 is nominally attached to the vehicle underbody 902 mechanically by connections to the metal backplate 903, which functions as an eddy current shield. The gap layer 904 is filled with a non-magnetic material, for instance an active or passive cooling/heating system (liquid or air-based), conduits, structural supporting members, air space, or a mix of the aforementioned as shown, for example, with respect to gap layer 804 of the GA 801. The backing core layer 905 is supported by structures extending thru the gap layer 904. Attached to the backing core layer 905, the secondary coil 906 serves to receive the magnetic flux generated by the corresponding GA's primary coil 808. Heat generated within the secondary coil 906 is conducted to and through the attached backing core layer 905 and to the environment through the VA's cover and case (not shown) via the paired inlet and outlet piping 907. Distributed Sensors 909 (e.g. thermocouple) reporting and control signaling is accomplished via a bidirectional or unidirectional datalink 908 as needed. One or more temperature sensors 909 may be located advantageously in the VA stack. In sample embodiments, the backing core spacing is set to optimize for the lowest power loss as described with respect to FIGS. 6 and 7.

FIG. 10

Figure 10:
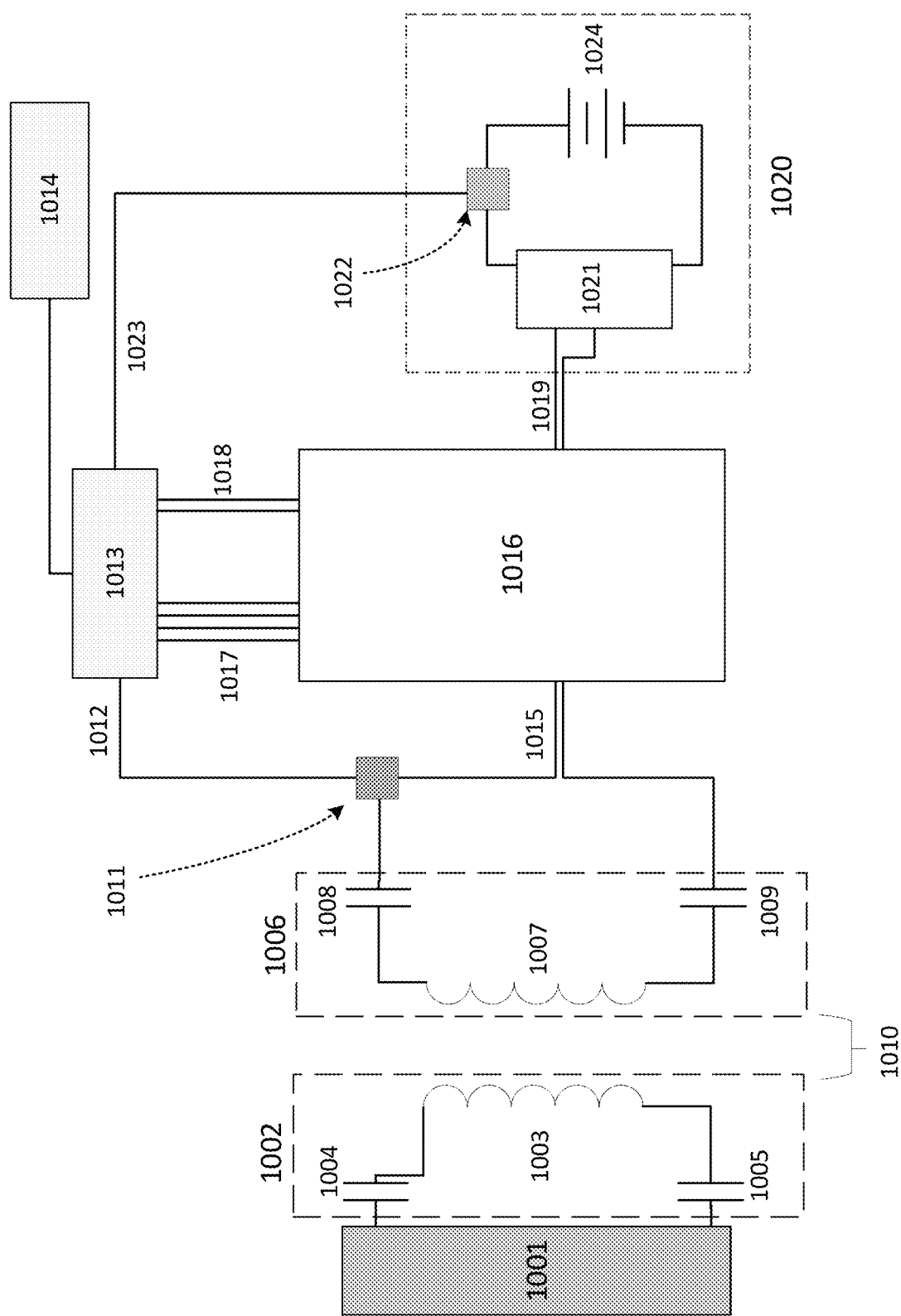
FIG. 10 schematically details a Wireless Power Transfer system for vehicular use.

FIG. 10 illustrates a high-power wireless power transfer system for electrical vehicles with battery storage. In this system, the ground-side electronics 1001 provides a conditioned power signal to the primary assembly 1002. As preferred in high power systems, the primary 1002 may have a balanced series-series configuration with the primary coil windings 1003 with matched capacitors 1004 and 1005. Across an air-gap 1010, the secondary assembly's coil 1006 is used to receive the magnetic signal generated by the primary 1002. The secondary coil 1006 also may have the balanced series-series configuration with the secondary coil windings 1007 with matched capacitors 1008 and 1009. The AC power level, frequency and phase (i.e. the AC signal data) generated by the secondary coil 1006 is measured by an a sensor 1011 which reports these measurements via digital datalink 1012 to the active rectifier controller (ARC) 1013. The ARC 1013 uses the AC signal data to predictively model the signal to determine zero crossings to optimize the active rectification. Rectification control signals are passed via control links 1017 to the active rectifier 1016 which takes the AC signal inputs 1015 and converts them to a DC power output 1019. Temperature sensors in the rectifier module use digital datalinks 1018 to report to the ARC 1013. The Power Conditioner 1020 takes the rectifier 1016 DC output 1019 and removes ripple and noise at filter 1021 to charge the battery pack 1024. The conditioned DC signal characteristics are monitored by a sensor 1022 and reported back to the ARC 1013 via digital datalink 1023. The ARC 1013 reports both AC and DC power characteristics to a networked controller 1014 for storage and reporting.

FIGS. 11A & 11B

Figure 11A:
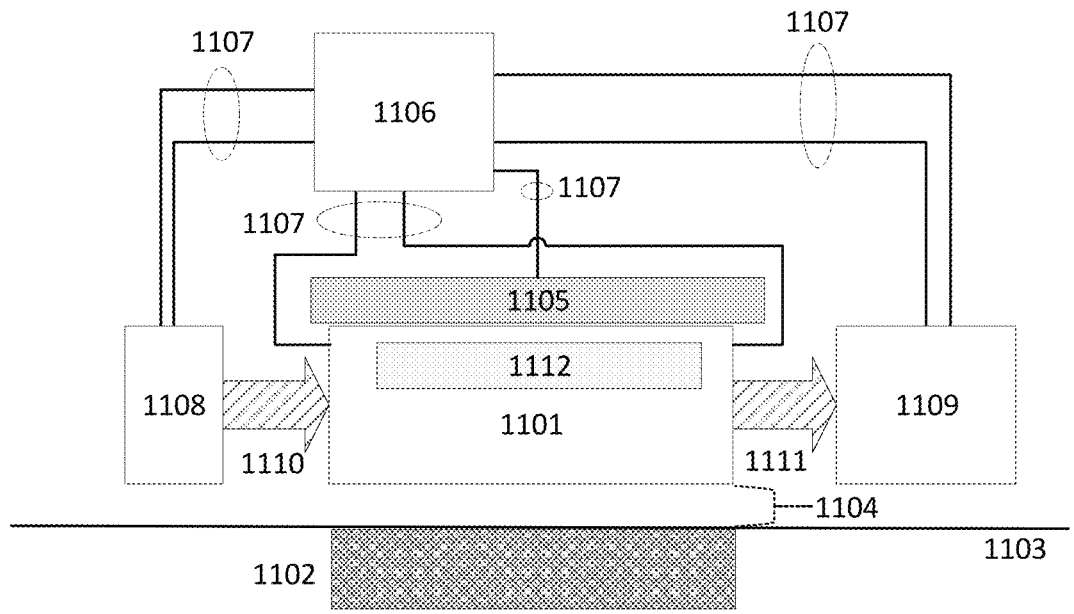
FIG. 11A illustrates at a high level, an exemplary passive or active air-cooled Vehicle Assembly.
Figure 11B:
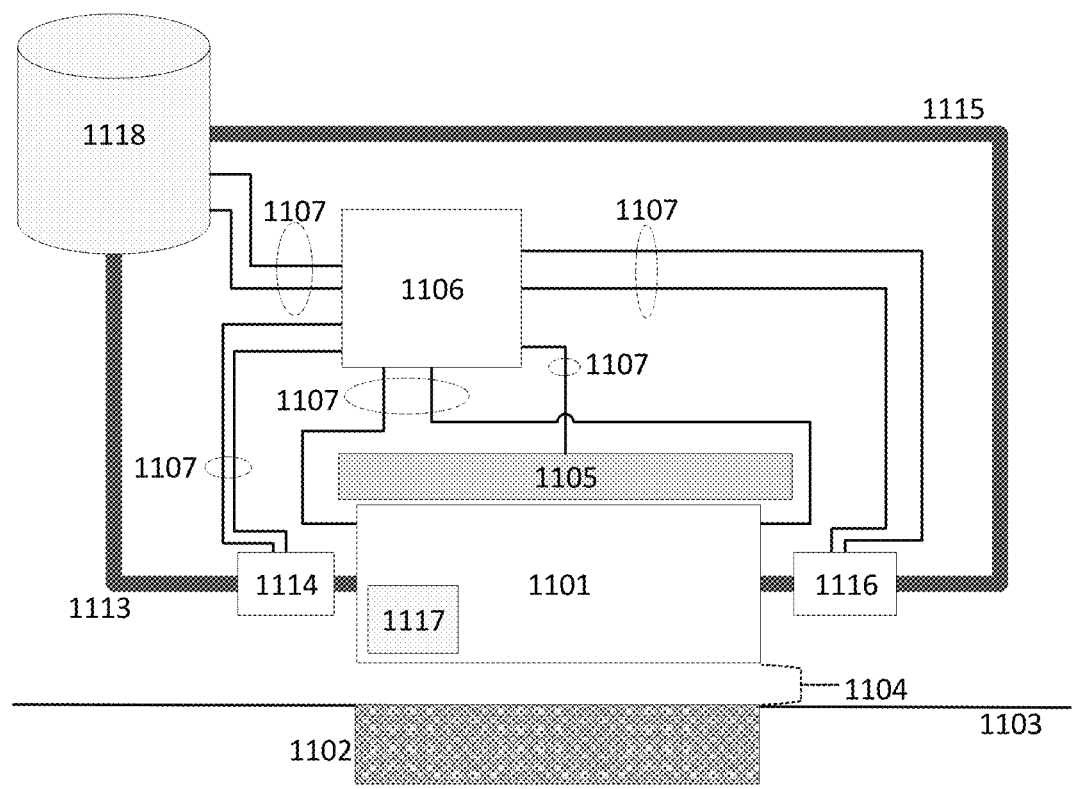
FIG. 11B illustrates at a high level, an exemplary liquid-cooled Vehicle Assembly.

FIG. 11A and FIG. 11B illustrate examples of embodiments for cooling the assembly (nominally the Vehicle Assembly (VA)) containing the secondary windings of an open-core, magnetic resonance-based Wireless Power Transfer (WPT) system. The VA is expected to be used intermittently, with aperiodic charging sessions and long cool-down periods after charging sessions.

FIG. 11A

FIG. 11A illustrates a system for air-cooling a mobile secondary in a Wireless

Power Transfer (WPT) system. Using the secondary coil winding (not shown) in magnetic resonance-based WPT, the VA 1101 receives power from the GA 1102 shown here embedded in the pavement 1103, although above-ground installations are contemplated. The magnetic flux (not shown) crosses the gap 1104 between the primary and secondary coils.

The vehicle mounted assembly (the VA) 1101 is structurally connected to the vehicle (not shown) by a heat conductive backplate 1105. The backplate 1105 also serves as a passive heat sink for the VA 1101. The backplate 1105 may be equipped with one or more temperature sensors (not shown) in the VA and on the front and/or rear surfaces of the backplate 1105 which provide readings to the Thermal Management System (TMS) 1106 through a bidirectional or unidirectional datalink 1107 (e.g. a CAN bus interface). Temperature sensors may be placed in the VA 1101 assembly wherever elevated temperatures are expected or have been historically encountered.

The TMS 1106 uses the inlet 1108 air temperature and various temperature readings from the VA 1101 in a predictive model to anticipate cooling requirements. When the cooling requirements are forecast to exceed the capabilities of the passive cooling, the active air-cooling components in the inlet 1108 and outlet 1109 are engaged as needed by the control links over the bidirectional datalink 1107. The resulting inflow 1110 and exhaust 1111 serve to cool the VA 1101. Internal structures 1112 within the VA 1101 are used to direct airflow and channel heat. Examples of the internal structures include heat pipes, cooling fins, directional vanes, and conduits sized to provide smoothed airflow for proportionate cooling for expected thermal load. The cooling structures comprised of non-magnetic material can hang from or otherwise be attached to the backing core layer and/or the backplate and provide a degree of structural support across the gap layer between the backing core and backplate.

FIG. 11B

FIG. 11B illustrates a system for liquid-cooling a mobile secondary in a Wireless Power Transfer (WPT) system. Using the secondary coil winding (not shown) in magnetic resonance-based WPT, the VA 1101 receives power from the GA 1102 via the primary coil (not shown) embedded in the pavement 1103, although above-ground installations are contemplated. The magnetic flux (not shown) crosses the gap 1104 between the primary and secondary coils.

The vehicle mounted assembly (the VA) 1101 is structurally connected to the vehicle (not shown) by a heat conductive backplate 1105. The backplate 1105 also serves as a passive heat sink for the VA 1101. The backplate 1105 is equipped with one or more temperature sensors in the VA 1101 and backplate 1105 that provide readings to the Thermal Management System (TMS) 1106 through a unidirectional or bidirectional datalink 1107 (e.g. a CAN bus interface). Temperature sensors (not shown) may be placed in the VA 1101 assembly wherever elevated temperatures are expected or have been historically encountered.

The TMS 1106 uses the air temperature and various temperature readings from the VA 1101 in a predictive model to anticipate cooling requirements. When the cooling requirements are forecast to exceed the capabilities of the passive cooling, active liquid cooling is engaged via control links over the network of bidirectional or unidirectional datalinks 1107. A vehicle-based coolant reservoir 1118 provides liquid coolant to the VA 1101. The liquid inflow 1113 is controlled via inlet valve 1114 and outflow 1115 through outlet valve 1116 that serves to cool the VA 1101. Internal structures 1117 within the VA 1101 are used to direct airflow and channel heat. Examples of the internal structures include heat exchangers, cooling loops, heat pipes, and pass-through conduits for proportionate cooling for expected thermal load. In this fashion, the TMS 1106 may circulate the cooling/heating fluid via one or more conduits to thermally manage the WPT coil assembly.

FIG. 12

Figure 12:
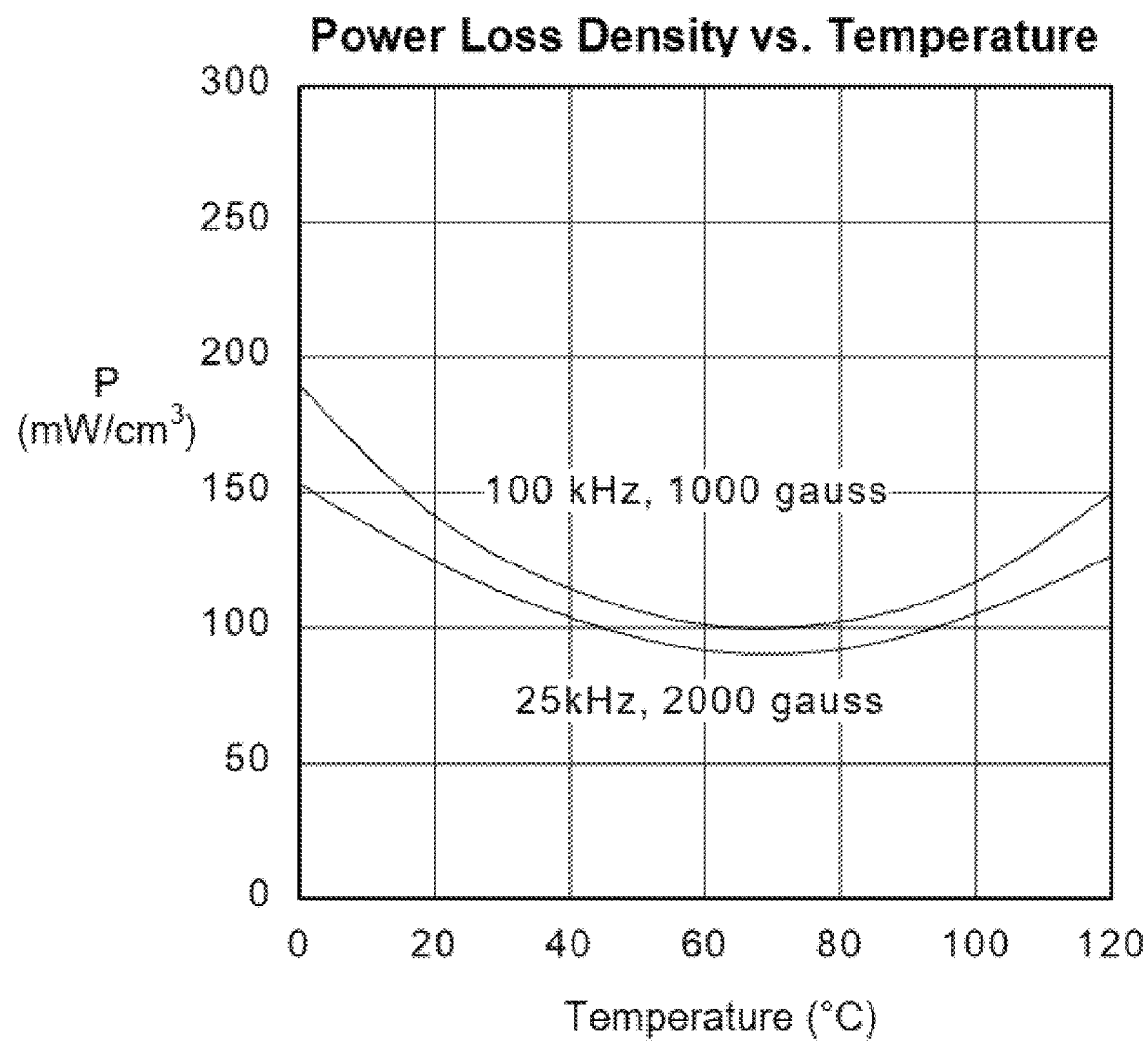
FIG. 12 shows the temperature sensitivity of the efficiency of a backing core expressed as power loss density versus backing core temperature.

FIG. 12 shows an example of the power loss density vs. temperature characteristic of a representative high-permeability magnetic material, for example a backing core consisting of manganese zinc iron (MnZnFe). More information regarding the magnetic material may be found in the datasheet "Material M25, Rev1" offered by National Magnetics Group, Inc. of Bethlehem, Pa., the content of which is incorporated by reference. In the example of FIG. 12, the power loss is substantially minimized between about 60° C. to about 80° C., which may be a desired optimal range in a sample embodiment.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

What is claimed:

1. An assembly for a wireless power transfer system, the assembly comprising:
 a wireless power transfer coil;
 a non-saturated backing core layer adjacent the wireless power transfer coil;
 an eddy current shield adapted to attach to a transmission side assembly or a receive side assembly for wireless power transfer;
 a gap layer between the backing core layer and the eddy current shield, the gap layer having a gap layer thickness in a gap layer thickness range for a given combined thickness of the backing core layer and the gap layer where eddy current loss in the eddy current shield is substantially flat over the gap layer thickness range; and
 an enclosure that encloses the wireless power transfer coil, backing core layer, gap layer and eddy current shield.

2. The assembly of claim 1, wherein a thickness of the backing core layer and a thickness of the gap layer are selected where a total power loss comprising power loss in the backing core layer plus eddy current loss in the eddy current shield is substantially minimized.

3. The assembly of claim 1, wherein the gap layer comprises an air space.

4. The assembly of claim 1, wherein the gap layer comprises at least one of an air space, a non-magnetic filling agent, a non-magnetic structural support element, at least one non-magnetic conduit, or a non-magnetic coolant.

5. The assembly of claim 4, wherein the at least one non-magnetic conduit circulates a cooling/heating fluid.

6. The assembly of claim 5, wherein the fluid is a liquid.

7. The assembly of claim 4, wherein the at least one non-magnetic conduit comprises a non-conductive, non-magnetic material placed immediately against the backing core layer.

8. The assembly of claim 4, wherein the at least one non-magnetic conduit comprises a non-conductive, non-magnetic material placed immediately against the eddy current shield.

9. The assembly of claim 5, further comprising a thermal management device that circulates the cooling/heating fluid in the at least one non-magnetic conduit to thermally manage the backing core layer to substantially minimize power loss due to hysteresis heating.

10. The assembly of claim 5, further comprising a thermal management device that circulates the cooling/heating fluid in the at least one non-magnetic conduit to thermally manage the wireless power transfer coil assembly.

11. The assembly of claim 9, wherein the eddy current shield comprises one or more temperature sensors that provide temperature readings to the thermal management device, which controls circulation of the cooling/heating fluid to maintain the backing core layer at a predetermined temperature to minimize power loss.

12. The assembly of claim 11, wherein the thermal management device provides an inlet air temperature and temperature readings from the backing core layer to a predictive model to anticipate heating/cooling requirements, and when the cooling or heating requirements are forecast to exceed capabilities of passive cooling or passive heating, the circulation of the cooling/heating fluid is controlled by the thermal management device to adjust a temperature of the backing core layer.

13. The assembly of claim 12, further comprising a cooling/heating fluid reservoir with at least one valve that is controlled by the thermal management system to provide cooling/heating fluid to the gap layer via the at least one conduit.

14. The assembly of claim 1, wherein the backing core layer comprises at least one of ferrite, layered metallic sheets, powdered oxides, sintered powdered oxides, or amorphous metals.

15. A method of assembling a wireless power transfer assembly of a wireless power transfer system, comprising:
providing a non-saturated backing core layer adjacent a wireless power transfer coil;
providing an eddy current shield adapted to attach to a transmission side assembly or a receive side assembly for wireless power transfer, the eddy current shield separated by a gap layer from the backing core layer, the gap layer having a gap layer thickness in a gap layer thickness range for a given combined thickness of the backing core layer and the gap layer where eddy current loss in the eddy current shield is substantially flat over the gap layer thickness range; and
enclosing the wireless power transfer coil, backing core layer, gap layer and eddy current shield in an enclosure.

16. The method of claim 15, further comprising selecting a thickness of the backing core layer versus a thickness of the gap layer where a total power loss comprising power loss in the backing core layer plus eddy current loss over the gap layer is substantially minimized.

17. The method of claim 15, further comprising circulating a cooling/heating fluid through at least one conduit in the gap layer that is placed immediately against the backing core layer.

18. The method of claim 17, further comprising a thermal management device thermally managing the backing core layer to minimize power loss by managing circulation of the cooling/heating fluid through the at least one conduit.

19. The method of claim 18, further comprising the thermal management device providing an inlet air temperature and temperature readings from the backing core layer to a predictive model to anticipate heating/cooling requirements, and when the cooling or heating requirements are forecast to exceed capabilities of passive cooling or passive heating, controlling circulation of the cooling/heating fluid to adjust a temperature of the backing core layer.

20. The method of claim 19, further comprising providing at least one cooling/heating fluid reservoir with at least one valve and the thermal management system controlling the at least one valve to provide cooling/heating fluid to the gap layer via the at least one conduit to provide heating or cooling to the backing core layer to substantially minimize power loss.

* * * * *